(12) United States Patent
Shah et al.

(10) Patent No.: US 7,450,735 B1
(45) Date of Patent: Nov. 11, 2008

(54) TRACKING ACROSS MULTIPLE CAMERAS WITH DISJOINT VIEWS

(75) Inventors: Mubarak Shah, Oviedo, FL (US);
Omar Javed, Orlando, FL (US);
Khurram Shafique, Orlando, FL (US);
Zeeshan Rasheed, Reston, VA (US)

(73) Assignee: University of Central Florida Research Foundation, Inc., Orlando, FL (US)

( * ) Notice: Subject to any disclaimer, the term of this patent is extended or adjusted under 35 U.S.C. 154(b) by 579 days.

(21) Appl. No.: 10/966,769

(22) Filed: Oct. 16, 2004

Related U.S. Application Data

(60) Provisional application No. 60/511,796, filed on Oct. 16, 2003.

(51) Int. Cl.
*G06K 9/00* (2006.01)
(52) U.S. Cl. ............... 382/103; 348/143; 348/169; 382/107; 382/190; 382/224; 382/294
(58) Field of Classification Search ............... 345/474; 348/169, 143, 416.1; 356/28, 29; 382/103, 382/107, 154, 294, 173, 190, 224
See application file for complete search history.

(56) References Cited

U.S. PATENT DOCUMENTS

| | | | | |
|---|---|---|---|---|
| 6,590,999 | B1* | 7/2003 | Comaniciu et al. | 382/103 |
| 6,597,801 | B1* | 7/2003 | Cham et al. | 382/103 |
| 6,999,599 | B2* | 2/2006 | Rui et al. | 382/103 |
| 7,242,423 | B2* | 7/2007 | Lin | 348/169 |
| 2004/0156530 | A1* | 8/2004 | Brodsky et al. | 382/103 |
| 2004/0252194 | A1* | 12/2004 | Lin | 348/169 |
| 2005/0002572 | A1* | 1/2005 | Saptharishi et al. | 382/224 |
| 2006/0088191 | A1* | 4/2006 | Zhang et al. | 382/107 |
| 2006/0140450 | A1* | 6/2006 | Hong et al. | 382/107 |
| 2006/0222205 | A1* | 10/2006 | Porikli et al. | 382/103 |
| 2007/0237359 | A1* | 10/2007 | Sun | 382/103 |

OTHER PUBLICATIONS

Thomas Kailath, The Divergence and Bhattacharyya Distance Measures in Signal Selection, Feb. 1967, IEEE vol. Com-15, No. 1, pp. 52-60.*
Q. Cai and J.K. Aggarwal. \Tracking human motion in structured environments using a distributed camera system. IEEE Trans. on Pattern Analysis and Machine Intelligence, 2(11):1241{1247, 1999.
R.T. Collins, A.J. Lipton, H. Fujiyoshi, and T. Kanade. \Algorithms for cooperative multisensor surveillance. Proceedings of IEEE, 89(10):1456{1477, 2001.

(Continued)

*Primary Examiner*—Gregory M Desire
(74) *Attorney, Agent, or Firm*—Brian S. Steinberger; Law Offices of Brian S. Steinberger, P.A.

(57) ABSTRACT

Tracking and surveillance methods and systems for monitoring objects passing in front of non-overlapping cameras. Invention finds corresponding tracks from different cameras and works out which object passing in front of the camera(s) made the tracks, in order to track the object from camera to camera. The invention uses an algorithm to learn inter-camera spatial temporal probability using Parzen windows, learns inter-camera appearance probabilities using distribution of Bhattacharyya distances between appearance models, establishes correspondences based on Maximum A Posteriori (MAP) framework combining both spatial temporal and appearance probabilities, and updates learned probabilities throughout the lifetime of the system.

17 Claims, 5 Drawing Sheets

OTHER PUBLICATIONS

S.L. Dockstader and A. M. Tekalp. \Multiple camera fusion for multi-object tracking. In IEEE Workshop on Multi-Object Tracking, 2001.

T. Huang and S. Russell. \Object identification in a bayesian context. In Proceedings of IJCAI,, 1997.

M. D. Grossberg and S. K. Nayar. \Determining the camera response from images: What is knowable?. IEEE Transactions on Pattern Analysis and Machine Intelligence, 25(11):1455{1467, Nov. 2003.

R. Jain and K. Wakimoto. \Multiple perspective interactive video. In IEEE International Conference on Multimedia Computing and Systems, 1995.

J. Kang, I. Cohen, and G. Medioni. \Continuous tracking within and across camera streams. In IEEE Conf. on Computer Vision and Pattern Recognition, 2003.

V. Kettnaker and R. Zabih. \Bayesian multi-camera surveillance. In IEEE Conf. on Computer Vision and Pattern Recognition, pp. 117{123, 1999.

S. Khan and M. Shah \Consistent labeling of tracked objects in multiple cameras with overlapping elds of view. IEEE Trans. on Pattern Analysis and Machine Intelligence, 25, 2003.

L. Lee, R. Romano, and G. Stein. \Monitoring activities from multiple video streams: Establishing a common coordinate frame. IEEE Trans. on Pattern Recognition and Machine Intelligence, 22(8):758{768, Aug. 2000.

A. Mittal and L.S. Davis. \M2 tracker: a multi-view approach to segmenting and tracking people in a cluttered scene. Int. Journal of Computer Vision, 51(3):189{203, 2003.

M. Oren and S. K. Nayar. \Generalization of the lambertian model and implications for machine vision. International Journal of Computer Vision, 14(3):227{251, Apr. 1995.

A. Rahimi and T. Darrell. \Simultaneous calibration and tracking with a network of non-overlapping sensors. In IEEE Conf. on Computer Vision and Pattern Recognition, 2004.

Ting-Hsun, Chang, and Shaogang Gong. \Tracking multiple people with a multi-camera system. In IEEE Workshop on Multi-Object Tracking, 2001.

Javed, Omar, Real Multi-Camera Video Surveillance, Candidacy Proposal, Apr. 13, 2003, pp. 1-113, School of Electrical Engineering and Computer Science, University of Central Florida.

* cited by examiner

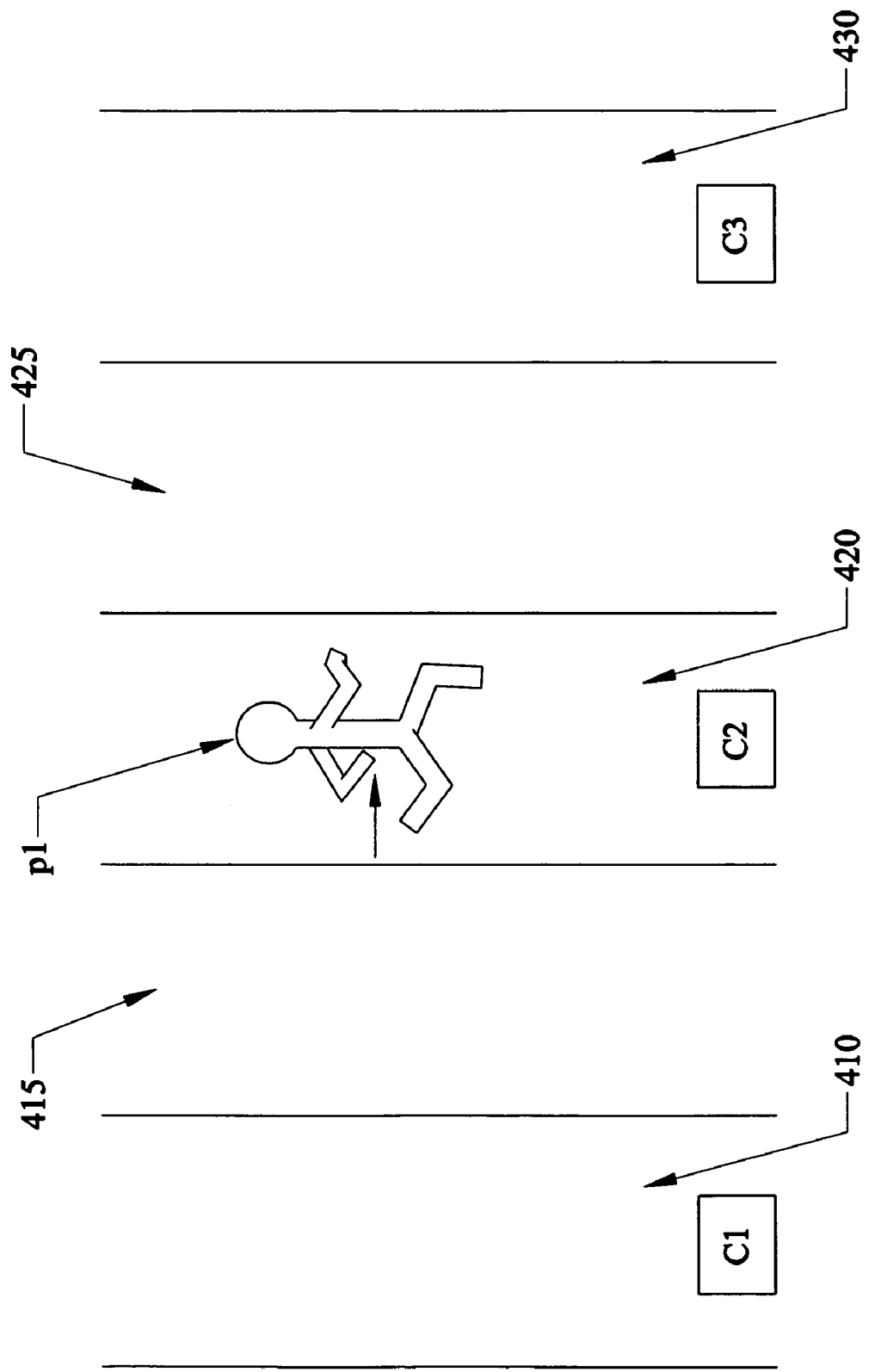

TRACKING ACROSS MULTIPLE CAMERAS WITH DISJOINT VIEWS

This invention claims the benefit of priority to U.S. Provisional Application Ser. No. 60/511,796 filed on Oct. 16, 2003.

FIELD OF INVENTION

This invention relates to tracking and surveillance, in particular to methods and systems of tracking person(s) that move in spaces between non-overlapping cameras.

BACKGROUND AND PRIOR ART

Video systems are well known in the field of security systems. In a typical security system one or more video cameras are placed to provide a field of view of the area under surveillance. These video cameras convert a visual image into electronic form suitable for transmission, recording or analysis. When the security system includes a network of cameras, tracking across cameras with non-overlapping views is a challenging problem. Firstly, the observations of an object are often widely separated in time and space when viewed from non-overlapping cameras. Secondly, the appearance of an object in one camera view might be very different from its appearance in another camera view due to the differences in illumination, pose and camera properties.

There has been a major effort underway in the vision community to develop fully automated surveillance and monitoring systems. Such systems have the advantage of providing continuous active warning capabilities and are especially useful in the areas of law enforcement, national defense, border control and airport security.

One important requirement for an automated surveillance system is the ability to determine the location of each object in the environment at each time instant. This problem of estimating the trajectory of an object as the object moves around a scene is known as tracking and it is one of the major topics of research in computer vision. In most cases, it is not possible for a single camera to observe the complete area of interest because sensor resolution is finite, and the structures in the scene limit the visible areas.

Therefore, surveillance of wide areas requires a system with the ability to track objects while observing them through multiple cameras. Moreover, it is usually not feasible to completely cover large areas with cameras having overlapping views due to economic and/or computational reasons. Thus, in realistic scenarios, the system should be able to handle multiple cameras with non-overlapping fields of view. Also, it is preferable that the tracking system does not require camera calibration or complete site modeling, since the luxury of fully calibrated cameras or site models is not available in most situations.

In general, multi-camera tracking methods differ from each other on the basis of their assumption of overlapping or non-overlapping views, explicit calibration vs. learning the inter-camera relationship, type of calibration, use of 3 D position of objects, and/or features used for establishing correspondences. The multi-camera tracking art is broken into two major categories based on the requirement of overlapping or non-overlapping views.

Multi-Camera Tracking Methods Requiring Overlapping Views:

A large amount of work on multi-camera surveillance assumes overlapping views. R. Jain and K. Wakimoto. "Multiple perspective interactive video" (1995) IEEE International Conference on Multimedia Computing and Systems, used calibrated cameras and an environmental model to obtain 3 D location of a person. The fact that multiple views of the same person are mapped to the same 3 D location was used for establishing correspondence. Q. Cai and J. K. Aggarwal, "Tracking human motion in structured environments using a distributed camera system" (1999), IEEE Trans. on Pattern Analysis and Machine Intelligence, 2(11): 1241-1247, used multiple calibrated cameras for surveillance.

Geometric and intensity features were used to match objects for tracking. These features were modeled as multivariate Gaussians and the Mahalanobis distance measure was used for matching. Ting-Hsun, Chang, and Shaogang Gong. "Tracking multiple people with a multi-camera system" (2001), IEEE Workshop on Multi-Object Tracking, discloses use of the top most point on an object detected in one camera to compute its associated epipolar line in other cameras. The distance between the epipolar line and the object detected in the other camera was used to constrain correspondence. In addition, height and color were also used as features for tracking.

The correspondences were obtained by combining these features using a Bayesian network. S. L. Dockstader and A. M. Tekalp. "Multiple camera fusion for multi-object tracking" (2001), IEEE Workshop on Multi-Object Tracking, also used Bayesian networks for tracking and occlusion reasoning across calibrated cameras with overlapping views. Sparse motion estimation and appearance were used as features. A. Mittal and L. S. Davis "M2 tracker: a multi-view approach to segmenting and tracking people in a cluttered scene" (2003), Int. Journal of Computer Vision, 51(3): 189-203 used a region-based stereo algorithm to estimate the depth of points potentially lying on foreground objects and projected them on the ground plane. The objects were located by examining the clusters of the projected points. In Kang et al "Continuous tracking within and across camera streams" (2003), IEEE Conf. on Computer Vision and Pattern Recognition, a method is disclosed for tracking in stationary and pan-tilt-zoom cameras.

The ground planes in the moving and stationary cameras were registered. The moving camera sequences were stabilized by using affine transformations. The location of each object was then projected into a global coordinate frame, which was used for tracking. An approach for tracking in cameras with overlapping field of views (FOV) that did not require explicit calibration is disclosed in L. Lee, R. Romano, and G. Stein. "Monitoring activities from multiple video streams: Establishing a common coordinate frame" (August 2000), IEEE Trans. on Pattern Recognition and Machine Intelligence, 22(8): 758-768. The camera calibration information was recovered by matching motion trajectories obtained from different views and plane homographices were computed from the most frequent matches. Explicit calibration was avoided in S. Khan and M. Shah.

"Consistent labeling of tracked objects in multiple cameras with overlapping fields of view" (2003), IEEE Trans. on Pattern Analysis and Machine Intelligence, 25, by using the FOV line constraints to handoff labels from one camera to another. The FOV information was learned during a training phase. Using this information, when an object was viewed in one camera, all the other cameras in which the object was visible could be predicted. Tracking in individual cameras was needed to be resolved before handoff could occur. Most of the above mentioned tracking methods require a large overlap in the FOVs of the cameras. This requirement is usually prohibitive in terms of cost and computational resources for surveillance of wide areas.

Multi-Camera Tracking Methods for Non-Overlapping Views:

To track people in an environment not fully covered by the camera fields of view, Collins et al. developed a system consisting of multiple calibrated cameras and a site model. See R. T. Collins, A. J. Lipton, H. Fujiyoshi, and T. Kanade, "Algorithms for cooperative multi sensor surveillance" (2001), Proceedings of IEEE, 89(10): 1456-1477. Normalized cross correlation of detected objects and their location on the 3 D site model were used for tracking. T. Huang and S. Russell. "Object identification in a Bayesian context" (1997), Proceedings of IJCAI, presents a probabilistic approach for tracking vehicles across two cameras on a highway.

The solution presented was application specific, i.e., vehicles traveling in one direction, vehicles being in one of three lanes and solution formulation for only two calibrated cameras. The appearance was modeled by the mean of the color of the whole object, which is not enough to distinguish between multi-colored objects like people. Transition times were modeled as Gaussian distributions and the initial transition probabilities were assumed to be known. The problem was transformed into a weighted assignment problem for establishing correspondence. Huang and Russell, trades off correct correspondence accuracy with solution space coverage, which forces them to commit early and possibly make erroneous correspondences.

V. Kettnaker and R. Zabih. "Bayesian multi-camera surveillance" (1999), IEEE Conf. on Computer Vision and Pattern Recognition, pages 1117-123, discloses use of a Bayesian formulation of the problem of reconstructing the paths of objects across multiple cameras. Their system requires manual input of the topology of allowable paths of movement and the transition probabilities. The appearances of objects were represented by using histograms. In Kettnaker and Zabih's formulation, the positions, velocities and transition times of objects across cameras were not jointly modeled. However, this assumption does not hold in practice as these features are usually highly correlated.

Ellis et al. determined the topology of a camera network by using a two stage algorithm. First the entry and exit zones of each camera were determined, then the links between these zones across seven cameras were found using the co-occurrence of entry and exit events. The system and method of the present invention assumes that correct correspondences cluster in the feature space (location and time) while the wrong correspondences are generally scattered across the feature space. The method also assumes that all objects moving across a particular camera pair have similar speed. See T. J. Ellis, D. Makris, and J. K. Black. "Learning a multi-camera topology" (2003), Joint IEEE International Workshop on Visual Surveillance and Performance Evaluation of Tracking and Surveillance.

Recently, a method was disclosed by A. Rahimi and T. Darrell, "Simultaneous calibration and tracking with a network of non-overlapping sensors" (2004), IEEE Conf. on Computer Vision and Pattern Recognition, to reconstruct the complete path of an object as it moved in a scene observed by non-overlapping cameras and to recover the ground plane calibration of the cameras. They modeled the dynamics of the moving object as a Markovian process. Given the location and velocity of the object from the multiple cameras, they estimated the most compatible trajectory with the object dynamics using a non-linear minimization scheme. Their scheme assumes that the correspondence of the trajectories in different cameras is already known. In contrast, establishing correspondence is the very problem to be solved.

The present invention contributes a system and method to determine correspondences between objects tracked by plural cameras when the tracks are separated in space and time using space-time features and appearance features of the object. Using Parzen windows, spatial temporal probability between cameras is learned and appearance probabilities are learned using distribution of Bhattacharyya distances between appearance models is learned for use in establishing correspondences between camera tracks. Through the method of the present invention, object tracks from plural cameras are automatically evaluated to determine correspondences between tracks, thus tracking an object moving around the area covered by the cameras.

Further objects and advantages of this invention will be apparent from the following detailed description of the presently preferred embodiments which are illustrated schematically in the accompanying drawings.

SUMMARY OF THE INVENTION

A primary objective of the present invention is to provide a method and system for tracking an object as the object passes before plural non-overlapping cameras, i.e. determining if an object detected in one camera is the same object that appeared in another camera.

A secondary objective of the present invention is to provide a method for generating a set of tracks corresponding to plural tracks recorded by plural cameras wherein the tracks are separated in space and time.

A novel system and method to automatically determine whether an object tracked by one camera is the same object tracked by a second camera without calibrating the cameras or providing site modeling. Spatial temporal probability and appearance probability between the first camera and the second camera are learned using Parzen windows and distribution of Bhattacharyya distances between appearance models, respectively. The spatial temporal and the appearance probabilities are then used to establish correspondences between objects tracked by the first camera and objects tracked by the second camera based on Maximum A Posteriori (MAP) framework.

Correspondences between tracks from different cameras represent a set of tracks for the same object in the real world. Through the method of the present invention, tracks from plural cameras are automatically evaluated to determine correspondences between tracks and forming a chain of consecutive correspondences, thus tracking an object passing before plural cameras.

Further objects and advantages of this invention will be apparent from the following detailed description of the presently preferred embodiments which are illustrated schematically in the accompanying drawings.

BRIEF DESCRIPTION OF THE FIGURES

FIG. 3 illustrates a person passing before one of plural cameras.

DESCRIPTION OF THE PREFERRED EMBODIMENTS

Before explaining the disclosed embodiments of the present invention in detail it is to be understood that the invention is not limited in its application to the details of the particular arrangements shown since the invention is capable of other embodiments. Also, the terminology used herein is for the purpose of description and not of limitation.

To deal with the first problem, it is observed that people or vehicles tend to follow the same paths in most cases, i.e., roads, walkways, corridors etc. The system and method of the present system uses this conformity in the traversed paths to establish correspondence. The system learns this conformity and hence the inter-camera relationships in the form of multivariate probability density of space-time variables (entry and exit locations, velocities, and transition times) using Parzen windows.

To handle the appearance change of an object as it moves from one camera to another, it is shown that all color transfer functions from a given camera to another camera lie in a low dimensional subspace. The tracking method and system learns this subspace by using probabilistic principal component analysis and uses it for appearance matching. The present invention does not require explicit inter-camera calibration, rather the system learns the camera topology and subspace of inter-camera color transfer functions during a training phase. Once the training is complete, correspondences are assigned using the maximum a posteriori (MAP) estimation framework using both location and appearance cues.

The method and system of the present invention uses probabilities to find correspondences between objects tracked by individual cameras. Simply put, a conventional security camera system tracks objects within view of individual cameras and records the tracks. The novel system and method disclosed herein, finds correspondences between the tracks recorded by individual cameras such that the two corresponded tracks (tracks from one camera and tracks from another camera) belong to the same object in the same world. The resultant set of tracks represents the path traveled by the object.

Figure 1:
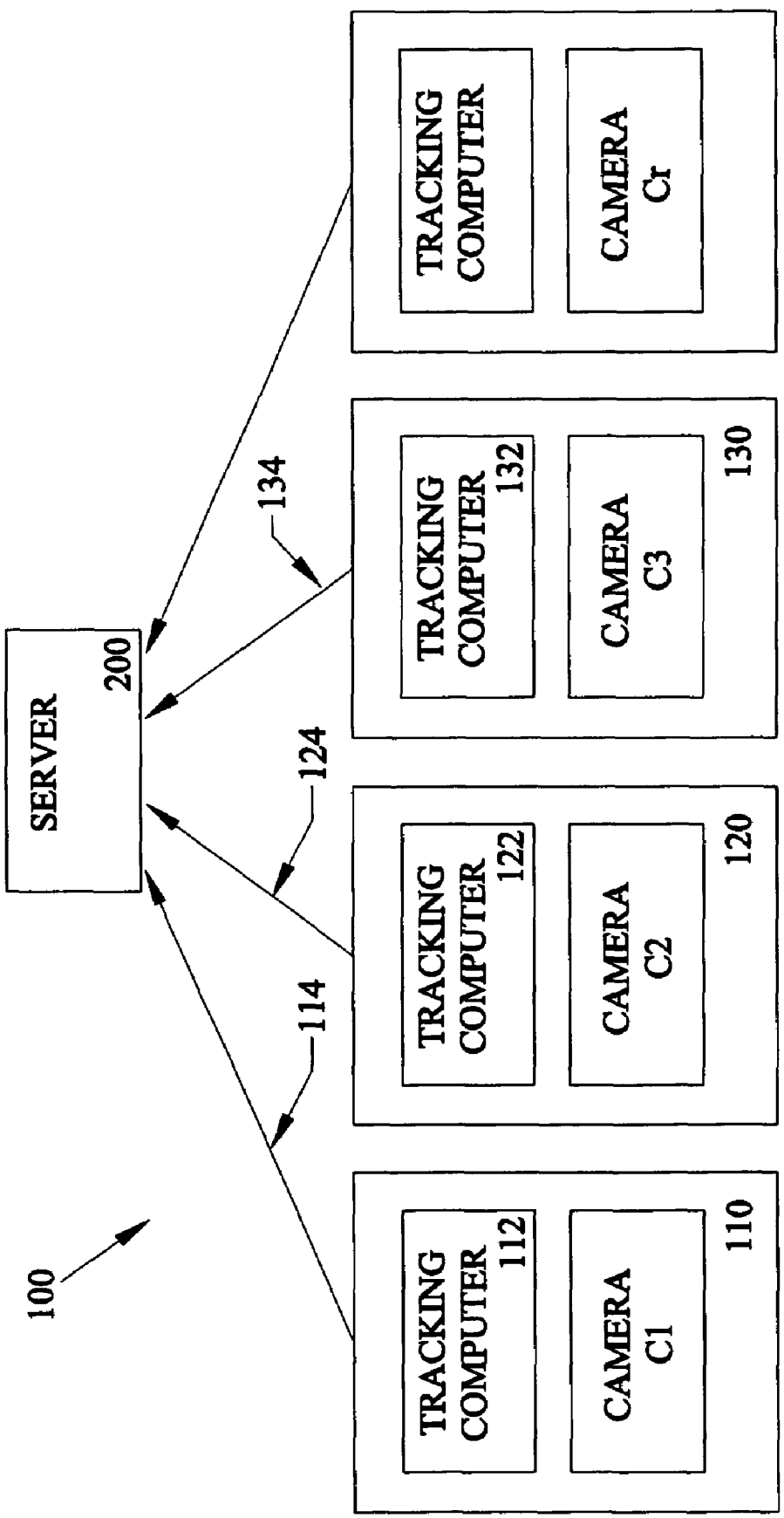
FIG. 1 is a block diagram of a security system.

For simplicity, the novel security system and method are discussed using the security system 100 configuration shown in FIG. 1. The security system 100 includes plural tracking systems 110, 120, and 130 each including a camera C1, C2, C3 and an interconnected tracking computer 112, 122, 132 respectively. The area covered by each successive camera is independent. The area covered by camera C1 does not overlap the area covered by camera C2 although the cameras may be physically adjacent to one another, leaving areas that are not covered. The areas between cameras that are not covered are referred to as inter-camera areas. The tracking security system 100 further includes a server 200 for receiving a tracking data 114, 124 and 134 from each individual tracking systems 110, 120 and 130.

Figure 2A:
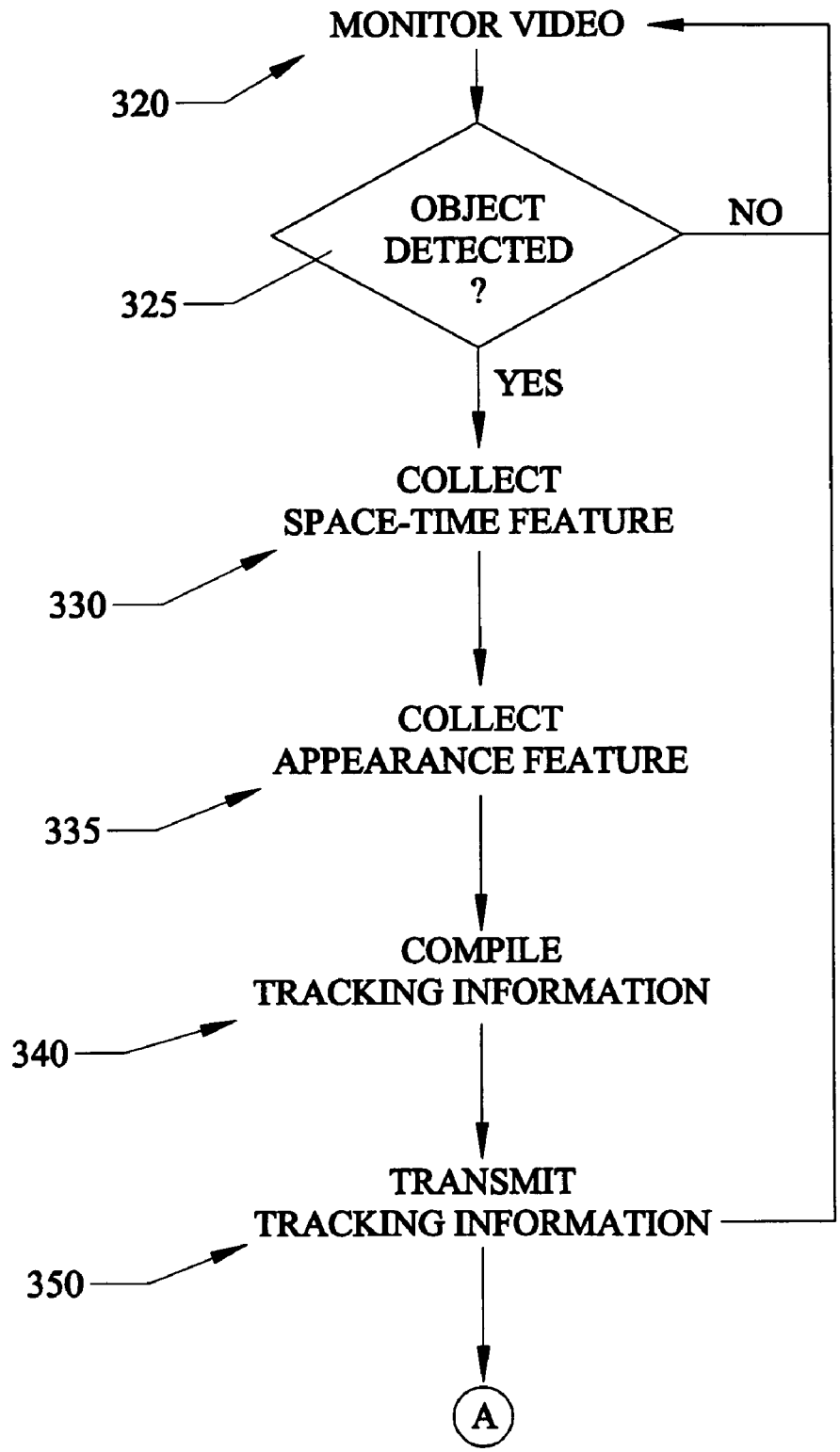
FIG. 2A is a flow diagram of the operation of an individual tracking computer.

Each tracking computer monitors the incoming video stream to detect the entrance of an object into the area covered by the camera. As shown in the flow diagram of FIG. 2A, each tracking system monitors an area in step 320. In step 325, when an object is detected in the area covered by a camera the space-time features of the object, the time and location of the object entry and exit, and the object appearance are recorded in steps 330 and 335 respectively. In step 340 the space-time feature and appearance feature of the detected object are compiled into a track by the individual tracking computer and in step 350 the compiled tracking information is transmitted to the server 200. The location and time the object enters and exits are recorded for calculating the time the object remained in the area and object velocity as the object exited the area as well as to determine the probability that the object is the same object detected by a preceding or successive tracking system.

Figure 2B:
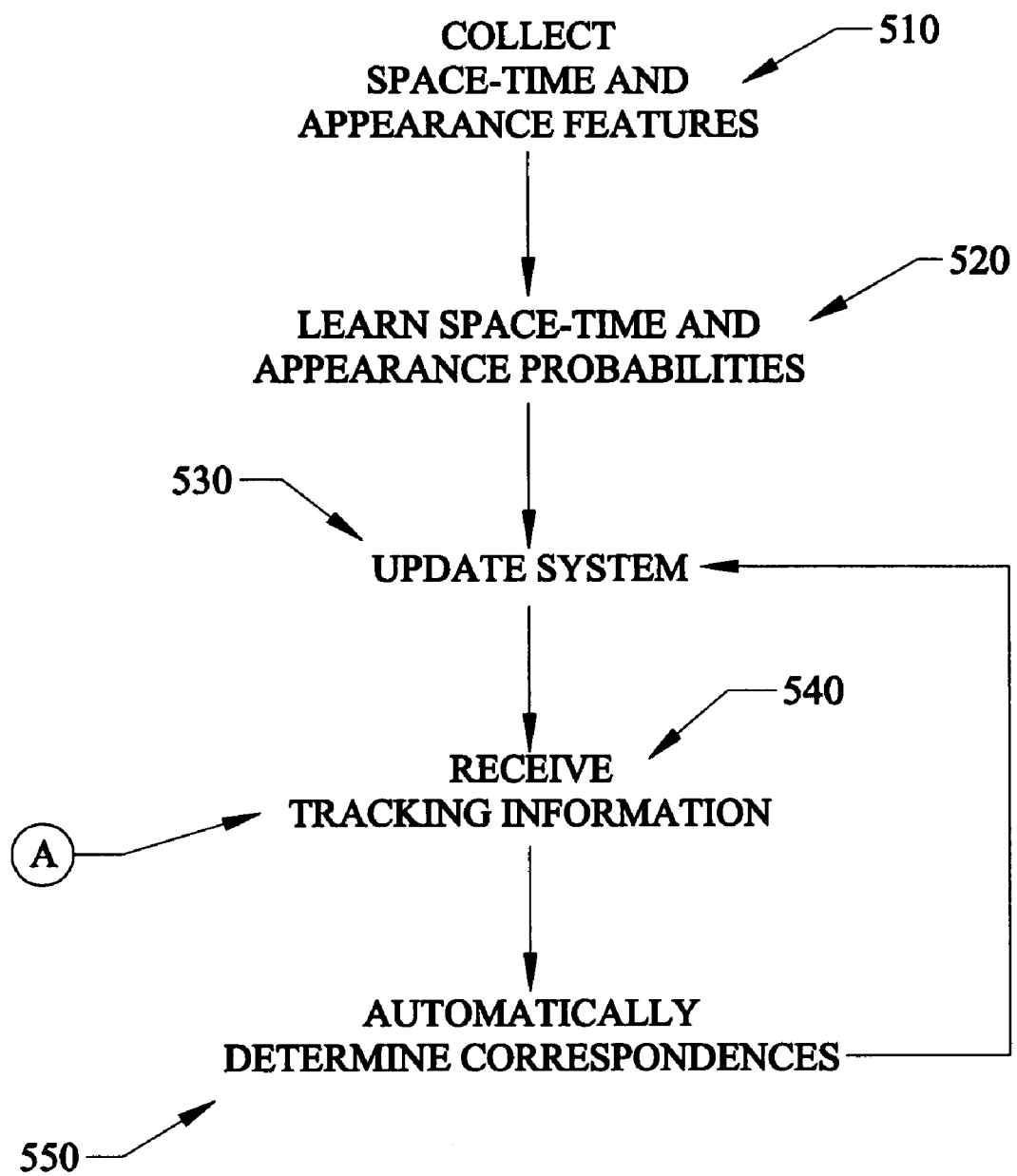
FIG. 2B is a flow diagram of the operation of a server.

In step 540 of FIG. 2B, the server 200 receives tracking information from the tracking system. Using the tracking information and the learned probabilities, automatically analyzes the tracking information in step 550 to determine correspondences between individual tracks. Tracks containing the same object, referred to as correspondences, are combined into a set of tracks. When organized by time cues, represent a patch traveled by the object in the real world. The space-time and appearance features received at the server 200 may, over time, be used to further update to system in step 530 following the learning process.

The areas monitored by the cameras are known. The unknown areas are the areas between camera coverage, the inter-camera areas. For inter-camera areas, the system is required to collect space-time and appearance features in step 510 of FIG. 2B for use learning path topologies (space-time probabilities) and appearance probabilities in step 520. One way learning is carried out is by assuming that the correspondences are known. For example, a single person may be used to roam the walkway and the data collected from the individual tracking system computers then used to determine the space-time probabilities. Another method for learning the probabilities is to use appearance matching to establish correspondences since path information is unknown. While the system is learning, it is not necessary correspond to all objects across cameras. Instead, only those closest in appearance are used. In step 530 of FIG. 2B, the server updates the system space-time and appearance probabilities for use determining correspondences.

To facilitate an understanding of the novel tracking system and method, an example is used to familiarize the reader to the terminology and the descriptors used in the calculation stage. Referring to FIGS. 1 and 3, the tracking system includes r cameras C1, C2, C3, ... Cr and the area covered by the cameras 410, 420, 430 are not overlapping areas, leaving inter-camera areas 415, 425. In FIG. 3 for example, a person p1 enters and exit's the area 420 covered by camera C2. The person p1 is traveling a through an area monitored by cameras C1, C2 and C3. As the person p1 travels from one camera to another camera, a set of observations $O_{1,1}$, $O_{1,2}$, ... $O_{1,m}$ for camera C1, $O_{2,1}$, $O_{2,2}$, ... $O_{2,m}$ for camera C2 and $O_{3,1}$, $O_{3,2}$, ... $O_{3,m}$ for camera C3, are recorded and a sequence of tracks $T1=T_{1,t1}$, $T_{1,t2}$, ... $T_{1,tm}$ are generated in the security system of cameras at successive time instances $t_m$. For example a sequence of tracks T by camera C1 are identified as $T_{1,t1}$, wherein $T_1$ refers to a track from camera C1 and t1 indicates a time t1 for track $T_1$, thus forming the descriptor $T_{1,t1}$. Each observation O recorded by the cameras C1, C2 and C3 is based on two features, appearance O(app) of the object and space-time features O(st). For example, camera C1 observations are referred to as $O_{1a}$(app) and $O_{1a}$(st) for a first observation and $O_{2a}$(app) and $O_{2a}$(st) for a next successive observation.

A Maximum A Posteriori (MAP) estimation framework uses the appearance and space-time cues in a principled manner for tracking. Parzen window, also known as kernel density estimators, are used to estimate the inter-camera space-time probabilities from a predetermined data, i.e., probability of an object entering a certain camera at a certain time given the location, time and velocity of the objects exit from other cameras. The space-time features collected by each camera tracking system include the time the object entered the area, the location at which the object entered and the time at which the object exited the area. The velocity of the object traveling through the area is calculated. The change in appearance as an object moves between certain cameras is modeled using distances between color models.

The correspondence probability, i.e., the probability that two observations are of the same object, depends on both the space-time and the appearance information. Tracks are assigned by estimating the correspondences, which maximize the posterior probabilities. This is achieved by transforming the MAP estimation problem into a problem of finding the path cover of a directed graph for which an efficient optimal solution exists.

Turning your attention to the calculations to determine a correspondence between appearance and space-time features from different cameras, assume that the tracking system includes r cameras $C_1, C_2, C_3, \ldots C_r$ and the view of the cameras are not overlapping views. Further assume that there are n objects $p_1, p_2, p_3, \ldots p_n$ in the environment such that each object generates a set of tracks Ti, Ti,t1, Ti,t2, Ti,tm in the system of cameras at successive time instances tm. Then let $Oj=\{O_{j,1}, O_{j,2} \ldots O_{j,m}\}$ be the set of $m_j$ observations (tracks) that were observed by the camera $C_j$ and is based on two features, appearance of the object $O_{j,a}$(app) and the space time features of the object $O_{j,a}$(St) which represent location, velocity and time. It is reasonable to assume that $O_{j,a}$(app) and $O_{j,a}$(st) are independent of each other, i.e., the appearance of an object does not depend on its space-time feature and vice versa.

The problem of multi-camera tracking is to find which of the observations in the system of cameras belong to the same object. Since the objects are time stamped and mutually exclusive (because of the non-overlapping field of view), it is helpful to view the set of observations of each object as a chain of observations with earlier observations preceding the latter ones. The task of grouping the observations of each object is finding the consecutive observations in each chain of observations.

For a formal definition of the problem, let a correspondence $k_{a,b}^{c,d}$ be an ordered pair $(O_{a,b}, O_{c,d})$, which defines the hypothesis that $O_{a,b}$ and $O_{c,d}$ are consecutive observations of the same object in the environment, with the observation $O_{a,b}$ preceding the observation $O_{c,d}$. The problem of multi-camera tracking is to find the correspondences $K=\{k_{a,b}^{c,d}\}$ such that $k_{a,b}^{c,d} \in K$ if and only if $O_{a,b}$ and $O_{c,d}$ correspond to consecutive observations in the same environment.

Let $\Sigma$ be the solution space of the multi-camera tracking problem as described above. Each observation of an object is preceded and succeeded by a maximum of one observation (of the same object). Hence, if $K=\{k_{i,a}^{j,b}\}$ is a candidate solution in $\Sigma$, then for all $\{k_{a,b}^{c,d}, k_{p,q}^{r,s}\} \subseteq K, (a,b) \neq (p,q) \hat{} (c,d) \neq (r,s)$. The solution of the multi-camera tracking is defined as a hypothesis in the solution space $\Sigma$ that maximizes a posteriori probability and is given by $$K' = \underset{K \in \Sigma}{\operatorname{argmax}} P(K \mid O).$$

Let $K=\{k_{i,a}^{j,b}\}$ be a hypothesis in $\Sigma$. Assuming that each correspondence, i.e., a matching between two observations, is conditionally independent of the other observations and correspondences, then $$P(K \mid O) = P(K \mid O_1, O_2, \ldots, O_r) = \prod_{k_{i,a}^{j,b} \in K} P(k_{i,a}^{j,b} \mid O_{i,a}, O_{j,b}), \quad (1)$$

where $P(k_{i,a}^{j,b} \mid O_{i,a}, O_{j,b})$ is the conditional probability of the correspondence $k_{i,a}^{j,b}$, given the observations $O_{i,a}$ and $O_{j,b}$ for two cameras $C_i$ and $C_j$ in the system. From Bayes Theorem, $$P(k_{i,a}^{j,b} \mid O_{i,a}, O_{j,b}) = \frac{P(O_{i,a}, O_{j,b} \mid k_{i,a}^{j,b}) P(k_{i,a}^{j,b})}{P(O_{i,a}, O_{j,b})}. \quad (2)$$

Using the above equation along with the independence of observations $O_{j,a}$(app) and $O_{j,a}$(st) (for all a and j), then $$P(K \mid O) = \quad (3)$$
$$\prod_{k_{i,a}^{j,b} \in K} \left( \left( \frac{1}{P(O_{i,a}, O_{j,b})} \right) P(O_{i,a}(app), O_{j,b}(app) \mid k_{i,a}^{j,b}) P(O_{i,a}(st),$$
$$O_{j,b}(st) \mid k_{i,a}^{j,b}) P(k_{i,a}^{j,b}) \right).$$

The prior $P(k_{i,a}^{j,b})$ is defined to be the probability $P(C_i, C_j)$ of a transition from camera $C_i$ to camera $C_j$. Moreover, assume that the observation pairs are uniformly distributed and hence, $P(O_{i,a}$ and $O_{j,b})$ is a constant scale factor. Then the problem is reduced to the solution of $$K' = \underset{K \in \Sigma}{\operatorname{argmax}} \prod_{k_{i,a}^{j,b} \in K} (P(O_{i,a}(app), \quad (4)$$
$$O_{j,b}(app) \mid k_{i,a}^{j,b}) P(O_{i,a}(st), O_{j,b}(st) \mid k_{i,a}^{j,b}) P(C_i, C_j)).$$

This is equivalent to maximizing the following term (where the product is replaced by summation by taking the log of the above term)

$$K' = \underset{K \in \Sigma}{\operatorname{argmax}} \sum_{k_{i,a}^{j,b} \in K} \log(P(O_{i,a}(app), \quad (5)$$
$$O_{j,b}(app) \mid k_{i,a}^{j,b}) P(O_{i,a}(st), O_{j,b}(st) \mid k_{i,a}^{j,b}) P(C_i, C_j)).$$

In order to maximize the posterior, it is necessary to find space-time and appearance probability density functions.

Learning Inter-Camera Space-Time Probabilities

Learning is carried out by assuming that the correspondences are known. One way to achieve this is to use only appearance matching for establishing correspondences since path information is unknown. Note that during the training it is not necessary to correspond to all objects across cameras. Only the best matches can be used for learning.

The Parzen window technique is used to estimate the space-time Probability Density Functions (pdfs) between each pair of cameras. Suppose a sample S consists of n, d dimensional, data points $x_1, x_2, x_3, \ldots x_n$ from a multivariate distribution p(x), then an estimate $\hat{p}(x)$ of the density at x can be calculated using $$\hat{p}(x) = \frac{1}{n}|H|^{-\frac{1}{2}}\sum_{i=1}^{n}\kappa\left(H^{-\frac{1}{2}}(x-x_i)\right), \quad (6)$$

where the d variate kernel k(x) is a bounded function satisfying $\int \kappa(x)dx=1$ and H is the symmetric d×d bandwidth matrix. The multivariate kernel k(x) can be generated from a product of symmetric univariate kernels $k_u$, i.e., $$\kappa(X) = \prod_{j=1}^{d}\kappa_u(x_{[j]}). \quad (7)$$

The position/time feature vector x, used for learning the space-time pdfs from camera $C_i$ and $C_j$, i.e., $P(O_{i,a}(st),O_{j,b}(st)|k_{i,a}^{j,b})$, is a vector, consisting of the exit location and entry locations in cameras, indices of entry and exit cameras, exit velocities, and the time interval between exit and entry events. Univariate Guassian kernels are used to generate k(x). Moreover, to reduce the complexity, H is assumed to be a diagonal matrix, $H=\text{diag}[h_1^2, h_2^2, \ldots, h_d^2]$. Each time a correspondence is made during learning, the observed feature is added to the sample S.

The observations of an object exiting from one camera and entering into another camera is separated by a certain time interval. This time is referred to as inter-camera travel time. Observations that are modeled using the novel system include the dependence of the inter-camera travel time on the magnitude and direction of motion of the object; the dependence of the inter-camera time interval on the location of exit from one camera and location of entrance in a second camera; and the correlation among the locations of exits and entrances in cameras.

Since the correspondences are known during learning, the likely time intervals and exit/entrance locations are learned by estimating the pdf. The reason for using the Parzen window approach for estimation is that, rather than imposing assumptions, the nonparametric technique allows direct approximation of the d dimensional density describing the joint pdf.

Estimating Change in Appearances Across Cameras

In addition to space-time information, changes in the appearance of an object from one camera to another is modeled. This is done to learn the change in the color of objects as they move between cameras from the learning data, and use it as a cue for establishing correspondences. A brightness transfer function (BTF) $f_{ij}$ is computed for each pair of cameras $C_i$ and $C_j$, such that $f_{ij}$ maps an observed color value in camera $C_j$. Once the mapping is known, the correspondence problem is reduced to the matching of transformed histograms or appearance models. Unfortunately, the mapping is not unique and it varies from frame to frame depending on a large number of parameters that include illumination, scene geometry, exposure time, focal length, and aperture size of each camera. Additionally, mapping does not even exist if the objects have arbitrary geometrical shape or if they have spectral reflectance. In these cases, two points with the same color in one image may have different colors in another image. To avoid such instances, it is assumed that the objects are planar and only have diffuse reflectance.

Despite the large number of unknown parameters, all BTFs from a given camera to another camera lie in a low dimensional subspace. This subspace is learned from the learning data and is used to determine how likely it is for observations in different cameras belong to the same object.

The Space of Brightness Transfer Functions

Let $L_i(p,t)$ denote the scene reflectance at a (world) point p of an object that is illuminated by white light, when viewed from camera $C_i$ at time instant t. By the assumption that the objects do not have specular reflectance, $L_i(p,t)$ is a product of material related terms, $M_i(p,t)=M(p)$ (for example, albedo) and illumination/camera geometry and object shape related terms, $G_i(p,t)$, then $$L_i(p,t)=M(p)G_i(p,t). \quad (8)$$

The above given Bi-directional Distribution Function (BRDF) model is valid for commonly used BRDFs, such as, Lambertain Model and the generalized Lambertain model as disclosed in M. Oren and S. K. Nayar, "Generalization of the lambertian model and implications for machine vision" (April 1995), International Journal of Computer Vision, 14(3): 227-251. See Table 1.

TABLE 1

Commonly used BRDF models.

| Model | M | G |
|---|---|---|
| Lambertian | ρ | $\frac{I}{\pi}\cos\theta_i$ |
| Generalized Lambertian | ρ | $\frac{I}{\pi}\cos\theta_i\left[1 - \frac{0.5\sigma^2}{\sigma^2+0.33} + \frac{0.15\sigma^2}{\sigma^2+0.09}\cos(\phi_i-\phi_r)\sin\alpha\,\tan\beta\right]$ |

As used in Table 1, the subscripts I and r denote the incident and the reflected directions measured with respect to surface normal. I is the source intensity, ρ is the albedo, σ is the surface roughness, $\alpha=\max(\theta_i,\theta_r)$ and $\beta=\min(\theta_i,\theta_r)$. Note that for generalized Lambertain model, the surface roughness σ is assumed to be a constant over the plane.

By the assumption of planarity, $G_i(p,t)=G_i(p,t)=G_i(t)$, for all points p and q on a given object. Therefore, $L_i(p,t)=M(p)G_i(t)$.

The image irradiance $E_i(p,t)$ is proportional to the scene radiance $L_i(p,t)$ and is given as $$E_i(p,t)=L_i(p,t)Y_i(t)=M(p)G_i(t)Y_i(t), \quad (9)$$

where $$Y_i(t) = \frac{\pi}{4}\left(\frac{d_i(t)}{h_i(t)}\right)^2 \cos^4\alpha_i(p,t) = \frac{\pi}{4}\left(\frac{d_i(t)}{h_i(t)}\right)^2 c_i$$

is a function of camera parameters at time t. $h_i(t)$ and $d_i(t)$ are the focal length and diameter (aperture) of lenses respectively, and $\alpha_i(p,t)$ is the angle that the principal ray from point p makes with the optical axis. The fall off in sensitivity due to the term $\cos^4\alpha_i(p,t)$ over an object is considered negligible and may be replaced with a constant c.

If $X_i(t)$ is the time of exposure, and gi is the radiometric response function of the camera $C_i$, then the measured (image) brightness of point p, $B_i(p,t)$, is related to the image irradiance as $$B_i(p,t)=g_i(E_i(p,t)X_i(t))=g_i(M(p)G_i(t)Y_i(t)X_i(t)), \quad (10)$$

i.e., the brightness, $B_i(p,t)$, of the image of a world point p at a time t, is a nonlinear function of the product of its material properties M(p), geometric properties $G_i(t)$, and camera parameters, $Y_i(t)$, and $X_i(t)$. Consider two cameras, $C_i$ and $C_j$, assume that a world point p is viewed by cameras $C_i$ and $C_j$ at time instances $t_i$ and $t_j$, respectively. Since material properties M of a world point remain constant, the $$M(p) = \frac{g_i^{-1}(B_i(p,t_i))}{G_i(t_i)Y_i(t_i)X_i(t_i)} = \frac{g_j^{-1}(B_j(p,t_j))}{G_j(t_j)Y_j(t_j)X_j(t_j)}. \quad (11)$$

Then, the brightness transfer function from the image of $C_i$ at time $t_i$ to the image of camera $C_j$ at time $t_j$ is given by $$B_j(p,t_j) = \quad (12)$$
$$g_j\left(\frac{G_j(t_j)Y_j(t_j)X_j(t_j)}{G_i(t_i)Y_i(t_i)X_i(t_i)}g_i^{-1}(B_i(p,t_i))\right) = g_j(w(t_i,t_j)g_i^{-1}(B_i(p,t_i))),$$

where $w(t_i,t_j)$ is a function camera parameters and illumination/scene geometry of cameras $C_i$ and $C_j$ at time instants $t_i$ and $t_j$, respectively. Since Equation 12 is valid for any point p on the object visible in the two cameras, the argument p is dropped from the notation. Also, since it is implicit that the BTF is different for any two pair of frames, the arguments $t_i$ and $t_j$ are dropped to simplify the calculation $f_{ij}$ denote a BTF from camera $C_i$ and $C_j$, then, $$B_j=g_j(wg_i^{-1}(B_i))=f_{ij}(B_i). \quad (13)$$

A non-parametric form of BTF is used by sampling $f_{ij}$ at a set of fixed increasing brightness values $B_i(1)<B_i(2)< \ldots <B_i(n)$, and representing it as a vector. That is $(B_i(1), \ldots, B_i(n))=(f_{ij}(B_i(1)), \ldots, f_{ij}(B_i(n)))$. The space of brightness transfer functions (SBTF) from camera $C_i$ to camera $C_j$ is denoted by $\Gamma_{ij}$. The dimension of $\Gamma_{ij}$ can be, at most d, where d is the number of discrete brightness values (for most imaging system where d=256). However, the following theorem shows that BTFs actually lie in a small subspace of the d dimensional space.

Estimation of Inter-camera BTFs and their Subspace

Consider a pair of cameras, $C_i$ and $C_j$. Corresponding observations of an object across this camera pair can be used to compute an inter-camera BTF. One way to determine BTF is to estimate pixel to pixel correspondence between the object views in the two cameras. However, self occlusion, change the scale of geometry, and different object poses can make finding the pixel to pixel correspondences from views of the same object in two different cameras difficult. Thus, normalized histograms of object brightness values for the BTF are used for the computation. Object color histograms are relatively robust to changes in object pose. In order to compute the BTF, assume that the percentage of image points on the observed object $O_{i,a}$(app) with brightness less than or equal to $B_i$ is equal to the percentage of image points in the observation $O_{j,a}$(app) with brightness less than or equal to $B_j$. A similar strategy was adopted by M. D. Grossberg and S. K. Nayar, "Determining the camera response from images: What is knowable?" (November 2003), IEEE Transactions on Pattern Analysis and Machine Intelligence, 25(11): 1455-1467, to obtain a BTF between images taken from the same camera of the same view but in different illumination conditions. Now, $H_i$ and $H_j$ are the normalized cumulative histograms of object observations $I_i$ and $I_j$ respectively, then $H_i(B_i)=H_j(B_j)=H_j(f_{ij}(B_j))$. Then, $$f_{ij}(B_i)=H_j^{-1}(H_i(B_i)), \quad (14)$$

where $H^{-1}$ is the inverted cumulative histogram.

As previously discussed, the BTF between two cameras changes with time due to illumination conditions, camera parameters, etc. The previous equation is used to estimate the brightness transfer function $f_{ij}$ for every pair of observations in the learning set. Let $F_{ij}$ be the collection of all the brightness transfer functions obtained in this manner, i.e., $\{f_{(ij)}\}$, $\eta \in \{1, \ldots, N\}$. To learn the subspace of the collection, the Probabilistic Principal Component Analysis (PPCA) is used. According to this model a d dimensional BTF $f_{ij}$ can be written as $$f_{ij}=Wy+\overline{f_{ij}}+\epsilon \quad (15)$$

Here y is normally a distributed q dimensional latent (subspace) variable, q<d, W is a d×q dimensional projection matrix that relates the subspace variables to the observed BTF, $\overline{f_{ij}}$ is the mean of the collection of BTFs, and $\epsilon$ is isotropic Gaussian noise, i.e., $\epsilon\sim N(O,\sigma^2 I)$. Given that y and $\epsilon$ are normally distributed, the distribution of $f_{ij}$ is given as $$f_{ij}\sim N(\overline{f_{ij}},Z), \quad (16)$$

where $Z=WW^T+\sigma^2 I$. Now, the projection matrix W is estimated as $$W=U_q(E_q-\sigma^2 I)^{1/2}R, \quad (17)$$

where the column vectors in the d×q dimensional $U_q$ are the eigenvectors of the sample covariance matrix of $F_{ij}$, Eq is a q×q diagonal matrix of corresponding eigenvalues $\lambda_1, \ldots, \lambda_q$, and R is an arbitrary orthogonal rotation matrix which is set to an identity matrix for computational purposes. The value of $\sigma^2$, which is the variance of the information 'lost' in the projection, is calculated as $$\sigma^2 = \frac{1}{d-q}\sum_{v=q+1}^{d}\lambda_v. \quad (18)$$

Once the values of $\sigma^2$ and W are known, the probability of a particular BTF belonging to a learned subspace of BTFs are calculated by using the distribution in Equation 16.

To this point, the calculations have been dealing with the brightness values of images and computing the brightness transfer functions. To deal with color images, each channel, i.e., is delt with separately. The transfer function for each channel (color transfer function) is computed as discussed above. The subspace parameters W and $\sigma^2$ are also computed separately for each color channel. It is not necessary to assume any camera parameters and response functions for the computation of these transfer functions and their subspace.

Computing Object Color similarity Across Cameras Using BTF Subspace

The observed color of an object can vary widely across multiple non-overlapping cameras due to change in scene illumination or any of the different camera parameters like gain and focal length. The learning phase provides the subspace of color transfer functions between the cameras, which models how colors of an object can change across the cameras. During a test phase, if the mapping between the colors of two observations is well explained by the learned subspace, then it is likely that these observations are generated by the same object. Specifically, for two observations $O_{i,a}$ and $O_{i,b}$ with color transfer functions (whose distribution is given by Equation 16) $f_{i,j}^R, f_{i,j}^G$ and $f_{i,j}^B$, the probability of the observation belonging to the same object is defined as $$P_{i,j}(O_{i,a}(app), O_{j,b}(app) | k_{i,a}^{j,b}) = \prod_{colr \in \{R,G,B\}} \frac{1}{(2\pi)^{\frac{d}{2}} |Z^{colr}|^{\frac{1}{2}}} e^{-\frac{1}{2}(f_{ij}^{colr} - \overline{f_{ij}^{colr}})^T Z^{-1}(f_{ij}^{colr} - \overline{f_{ij}^{colr}})}, \quad (19)$$

where $Z = WW^T + \sigma^2 I$.

The color superscript denotes the color channel for which the value of Z and $\overline{f_{ij}}$ were calculated. The values of Z and $\overline{f_{ij}}$ are computed from the training data using Equation 17 and Equation 18 respectively.

Establishing Correspondences

As previously discussed, the problem of multi-camera tracking is to find a set of correspondences K', such that, each observation is preceded or succeeded by a maximum of one observation, and that maximizes the posteriori probability, that is, $$K' = \underset{K \in \Sigma}{\text{argmax}} \sum_{k_{i,a}^{j,b} \in K} \log(P(O_{i,a}(app), \quad (20)$$

$$O_{j,b}(app) | k_{i,a}^{j,b}) P(O_{i,a}(st), O_{j,b}(st) | k_{i,a}^{j,b}) P(C_i, C_j)),$$

where each observation $O_{i,a}$ consists of all the measurements of some object from its entry to the exit in the field of view of camera $C_i$.

The difficulty of finding the a posteriori probability can be modeled as a graph theoretical problem as follows. A constructed graph is constructed such that for each observation $O_{i,a}$, there is a corresponding vertex in the directed graph, while each hypothesized correspondence $k_{i,a}^{j,b}$ is modeled by an arc from the vertex of observation $O_{i,a}$ to the vertex of observation $O_{j,b}$. The weight of this arc of the hypothesized correspondence $k_{i,a}^{j,b}$ is computed from the space-time and appearance probability terms in Equation 4. These probabilities are computed using the above described methods. With the constraint that an observation can correspond to at most one preceding and one succeeding observations, each candidate solution is a set directed paths (of length 0 or more) in the graph. Also, since every observation corresponds to some object, every vertex of the graph is in one path of solutions. Hence, each candidate solution in the solution space is a set of directed paths in the constructed graph, such that each vertex of the graph is in one path of this set. Such a set is called a vertex disjoint path cover of a directed graph. The weight of a path cover is defined by the sum of all the weights of the edges in the path cover. Hence, a path cover with the maximum weight corresponds to the solution of the MAP problem as defined in Equation 5.

The problem of finding a maximum weight path cover is optimally solved in polynomial time if the graph is acyclic. Recall that $k_{a,b}^{c,d}$ defines the hypothesis that the observations $O_{a,b}$ and $O_{c,d}$ are consecutive observations of the same object in the environment, with the observation $O_{a,b}$ preceding $O_{c,d}$. Thus, by the construction of the of the graph, the arcs are in the direction of increasing time, and hence, the graph is acyclic. The maximum weight path cover of an acyclic directed graph is found by reducing the problem to finding the maximum matching of an undirected bipartite graph.

Figure 4A:
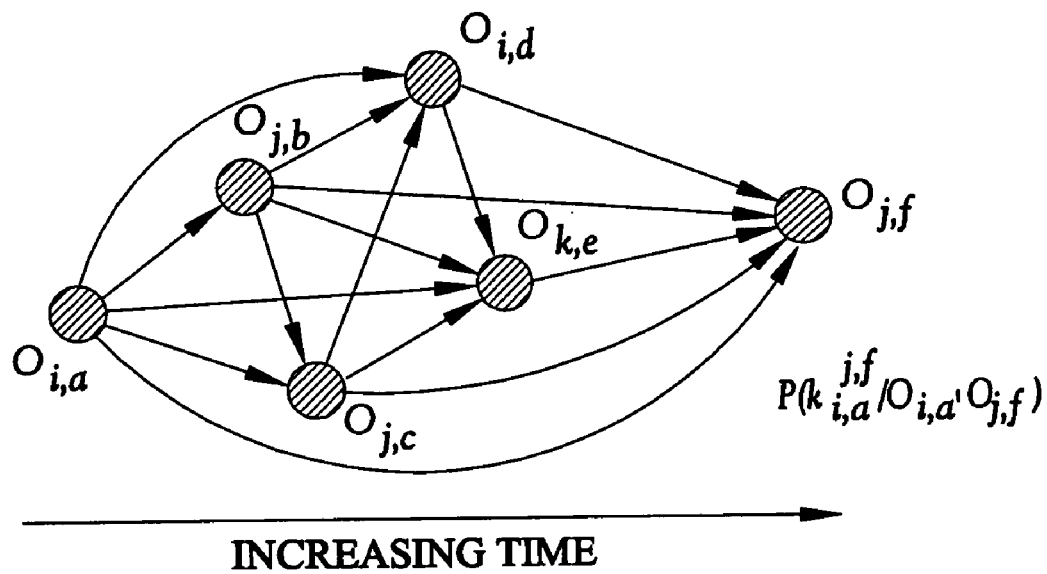
FIG. 4A is an example of a directed graph.
Figure 4B:
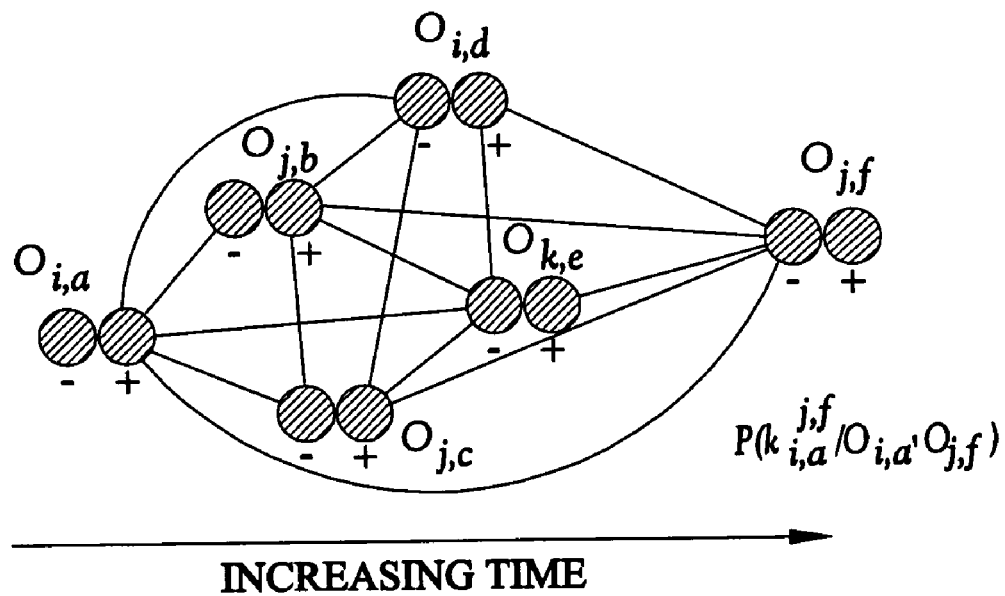
FIG. 4B is a bipartite graph constructed from the graph of FIG. 4A.

This bipartite graph is obtained by splitting every vertex v of the directed graph into two vertices v⁻ and v⁺ such that each coming into the vertex v is sub estimated by an edge incident to the vertex v⁻, while the vertex v⁺ is connected to an edge for every arc going out of the vertex v in the directed graph. The bipartite graph obtained from the directed graph of FIG. 4A is shown in FIG. 4B. FIG. 4A is an example of a directed graph that formulates the multi-camera tracking problem. Each observation $O_{m,n}$ is assigned a vertex of the graph. For each pair of vertices, $(O_{i,a}, O_{i,b})$, there is an arc between them in the direction of increasing time and having weight $P(k_{i,a}^{j,b} | O_{i,a}, O_{j,b})$. FIG. 4B shows the bipartite graph constructed from the directed graph of FIG. 4A. Each vertex of the directed graph is split into + and − vertices, such that the + vertex is adjacent to an edge for each arc extending out of the vertex and the − vertex is adjacent to an edge for each arc extending into the vertex. The weight of an edge is the same as the weight of the corresponding arc. The graph is bipartite since no + vertex is adjacent to a + vertex and no − vertex is adjacent to a − vertex.

The edges in the maximum matching of the constructed bipartite graph correspond to the arcs in the maximum weight path cover of the original directed graph. The maximum matching of a bipartitie graph is found by an $O(n^{2.5})$ algorithm as disclosed in J. Hopcroft and R. Karp, "An n2:5 algorithm for maximum matching in bipartite graphs" (December 1973), SIAM J. Computing, where n is the total number of observations in the system.

The system and method of the present invention tracks objects across multiple non-overlapping cameras. Accurate tracking is possible even when observations of the object are not available for relatively long periods of time due to non-overlapping camera views. Using the method of the present invention camera topology and inter-camera spatio-temporal relationships are learned by observing motion of people as they move across a scene. The relationship between the appearances of objects across cameras is also learned by estimating the subspace of brightness transfer functions.

The spatio-temporal cues used to constrain correspondences include inter-camera time intervals, location of exit/entrances, and velocities. For appearance matching, the present invention uses a novel system and method of modeling the change of appearance across cameras. The novel appearance matching system and method uses the assumption that all brightness transfer functions from a given camera to another camera lie in a low dimensional subspace. The subspace is learned by using probabilistic principal component analysis on the BTFs obtained from the learning data and it uses it for appearance matching. The space-time cues are combined with the appearance matching scheme in a Bayesian framework for tracking.

While the invention has been described, disclosed, illustrated and shown in various terms of certain embodiments or modifications which it has presumed in practice, the scope of the invention is not intended to be, nor should it be deemed to be, limited thereby and such other modifications or embodiments as may be suggested by the teachings herein are particularly reserved especially as they fall within the breadth and scope of the claims here appended.

We claim:

1. A method of tracking an object passing before non-overlapping cameras, comprising the steps of:
    tracking the object between a first camera and a second camera; and
    automatically determining whether the object is identical in both the first camera and the second camera without calibrating the cameras or providing a site modeling, wherein the determining step includes the steps of:
        learning inter-camera spatial temporal probability between the first camera and the second camera using Parzen windows;
        learning inter-camera appearance probabilities between the first camera and the second camera using distribution of Bhattacharyya distances between appearance models;
        establishing correspondences between the first camera and the second camera based on Maximum A Posteriori (MAP) framework combining both the spatial temporal and the appearance probabilities; and
        updating learned probabilities throughout over time.

2. The method of claim 1, wherein the inter-camera spatial temporal probability learning step includes the steps of:
    assuming a known correspondence; and
    estimating a space-time probability density function for the first camera and the second camera using the Parzen windows.

3. The method of claim 2, wherein the estimating step includes the step of: learning exit and entry locations, velocities, and transition times of the object between the first camera and the second camera.

4. The method of claim 1, wherein the inter-camera appearance probabilities learning step includes the step of:
    estimating a change in appearance of the object from the first camera to the second camera.

5. The method of claim 4, wherein the estimating step includes the step of: generating color histograms of the object at the first camera and the second camera; and
    estimating the inter-camera brightness transfer function using the generated color histograms.

6. The method of claim 5, further including the step of:
    using the inter-camera brightness transfer function to estimate the probability that the object is identical in both the first camera and the second camera.

7. The method of claim 1, wherein the tracking step includes the step of: detecting a first observation and a second observation of the object passing before the first camera and the second camera.

8. The method of claim 7, further including the step of:
    establishing a correspondence between the first detected observation and the second detected observation to determine a path covered by the object.

9. The method of claim 7, further including the step of:
    establishing that the first observation is preceded and succeeded by only the second observation and vice versa.

10. The method of claim 7, wherein the detecting step includes the steps of: collecting a space-time feature and an appearance feature of the object in the first observation and the second observation.

11. The method of claim 1, further comprising the step of:
    using the updated learned probabilities to establish correspondences between the first camera and the second camera over time.

12. The method of claim 1, further comprising the step of:
    providing a third camera for the tracking of the object.

13. A system for tracking an object passing between non-overlapping cameras without calibrating the cameras or completing site modeling, comprising:
    plural cameras for tracking the object; and
    means for automatically determining whether the object in both a first one of the plural cameras and a second one of the plural cameras are a same object, wherein the determining means includes:
        means for learning inter-camera spatial temporal probability between a first camera and the second camera using Parzen windows, wherein the spatial temporal probability learning means includes
            means for collecting plural space-time features from the first camera and the second camera; and
            means for estimating a space-time probability density function for the first camera and the second camera;
        means for learning inter-camera appearance probabilities between the first camera and the second camera using distribution of Bhattacharyya distances between appearance models;
        means for establishing correspondences between the first camera and the second camera based on Maximum A Posteriora framework combining both the learned inter-camera spatial temporal and appearance probabilities; and
        means for updating the learned probabilities throughout over time.

14. The system of claim 13, wherein the plural cameras comprise:
    means for collecting plural observations of the object observed at the plural cameras;
    means for collecting a time-space feature and an appearance feature for each of the plural observations.

15. The system of claim 14, further comprising:
    means for grouping the ones of the plural observations to form a chain of consecutive observations of the object.

16. A system for tracking an object passing between non-overlapping cameras without calibrating the cameras or completing site modeling, comprising:
    plural cameras for tracking the object; and
    means for automatically determining whether the object in both a first one of the plural cameras and a second one of the plural cameras are a same object, wherein the determining means includes:
        means for learning inter-camera spatial temporal probability between a first camera and the second camera using Parzen windows;
        means for learning inter-camera appearance probabilities between the first camera and the second camera using distribution of Bhattacharyya distances between appearance models wherein the appearance probability learning means includes:

means for estimating a change of appearance of the object from the first camera to the second camera;

means for establishing correspondences between the first camera and the second camera based on Maximum A Posteriora framework combining both the learned inter-camera spatial temporal and appearance probabilities; and means for updating the learned probabilities throughout over time.

17. The system of claim 16 wherein the change of appearance estimating means comprises:

means for generating color histograms of the object at the first camera and the second camera; and means for estimating an inter-camera brightness transfer function of the object using the generated color histograms.

* * * * *